UNITED STATES PATENT OFFICE.

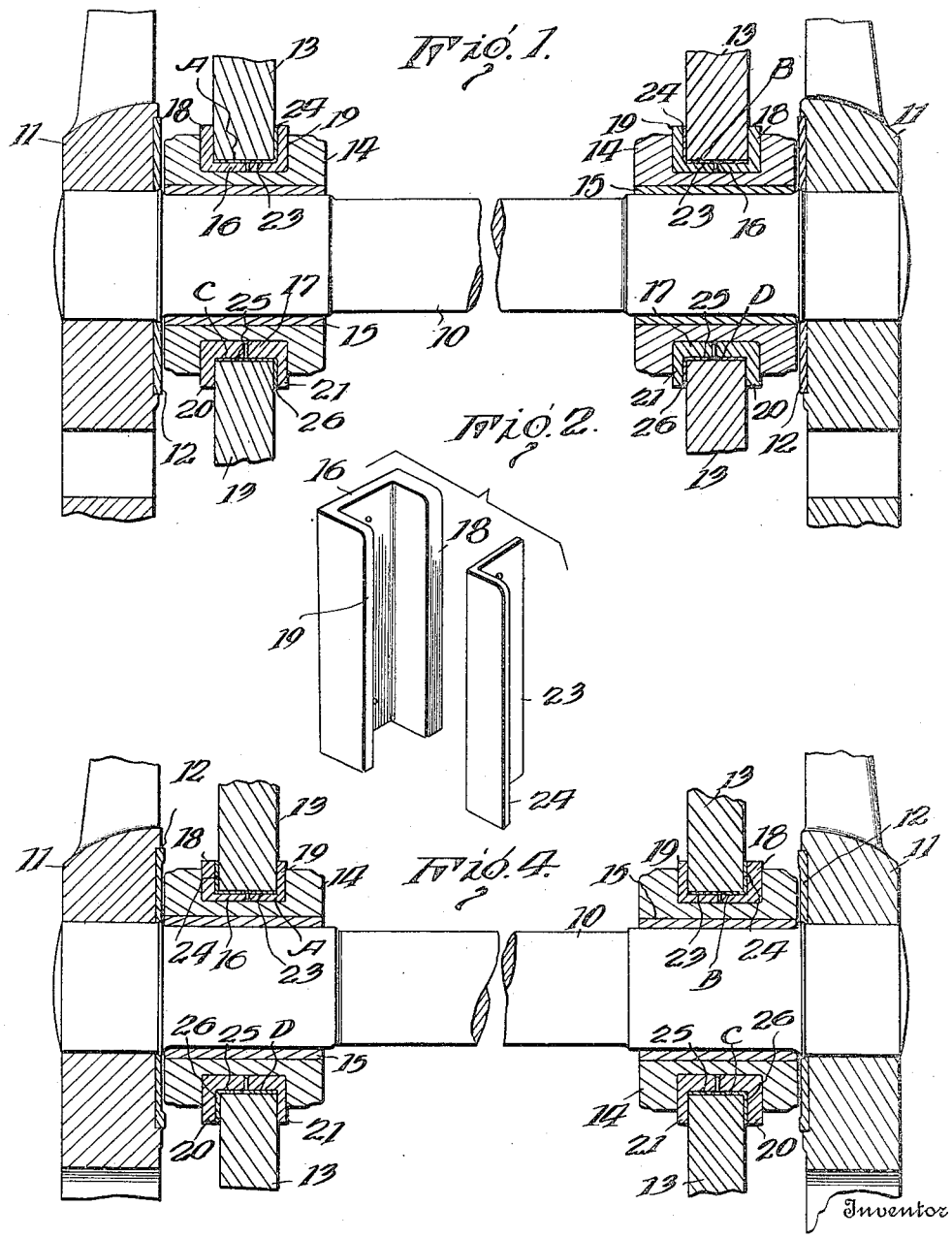

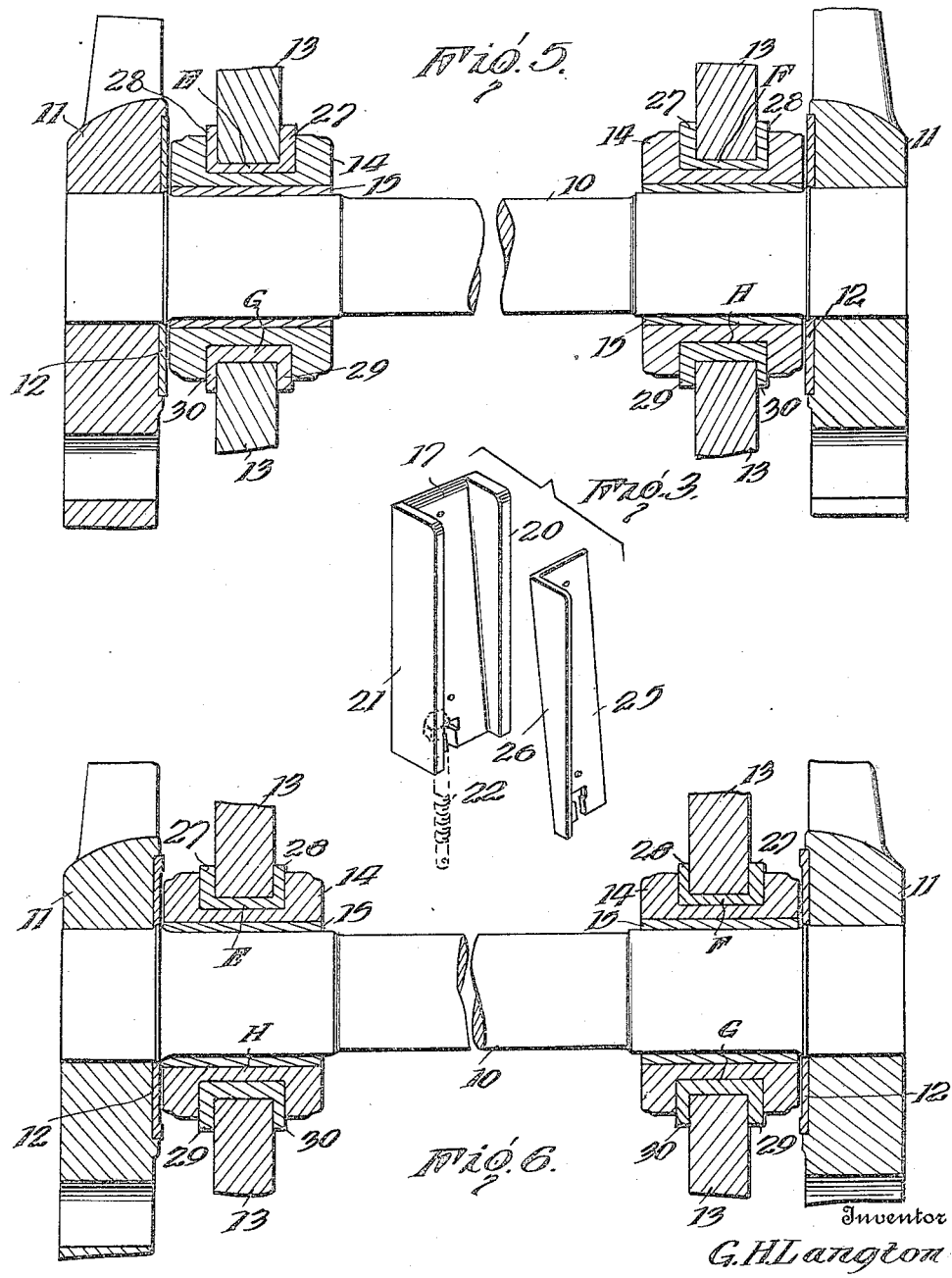

GEORGE H. LANGTON, OF PORTSMOUTH, VIRGINIA, ASSIGNOR OF ONE-HALF TO JOHN W. SMALL, OF PORTSMOUTH, VIRGINIA.

LOCOMOTIVE-JOURNAL-BOX MOUNTING.

1,213,506.

Specification of Letters Patent.   Patented Jan. 23, 1917.

Application filed September 18, 1916. Serial No. 120,793.

*To all whom it may concern:*

Be it known that I, GEORGE H. LANGTON, a citizen of the United States, residing at Portsmouth, in the county of Norfolk and State of Virginia, have invented certain new and useful Improvements in Locomotive-Journal-Box Mountings, of which the following is a specification.

This invention relates to an improved locomotive journal box mounting for taking up wear between the hub faces of the boxes and the wheel hubs for overcoming lateral play in the wheels.

The invention has as its primary object to provide a simple and efficient construction for expeditiously adjusting the journal boxes for the purpose set forth without removing the locomotive wheels.

The invention has as a further object to provide an arrangement wherein the shoes and wedges for the boxes will be formed to coöperate with liners for forcing the boxes outwardly toward the wheel hubs. And the invention has as a still further object to form the shoes and wedges to normally receive the said liners and wherein the boxes may be adjusted laterally by simply reversing the liners of the shoes end for end and interchanging the liners of the wedges.

Other and incidental objects will appear as the description proceeds and in the drawings wherein I have illustrated the preferred embodiment of the invention and wherein similar reference characters designate corresponding parts throughout the several views—

Figure 1 is a fragmentary horizontal sectional view showing a locomotive axle with the wheels partly broken away and illustrating the normal disposition of the liners employed within the shoes and wedges for the journal boxes of the axle, Fig. 2 is a detail perspective view of one of the shoes and of one of the shoe liners, Fig. 3 is a similar view showing one of the wedges and one of the wedge liners, this view also illustrating the screw for adjusting the wedges vertically in the usual manner, Fig. 4 is a view similar to Fig. 1 and illustrating the disposition of the liners of the shoes and the liners of the wedges as adjusted for taking up wear between the wheel hubs and the hub faces of the journal boxes, Fig. 5 is a fragmentary horizontal sectional view showing a modified form of the invention wherein the use of liners is eliminated and showing the normal disposition of the shoes and wedges with respect to the journal boxes, and Fig. 6 is a view similar to Fig. 5 and illustrating the disposition of the shoes and wedges as arranged for adjusting the boxes outwardly toward the wheel hubs.

In order that the construction and operation of the present invention may be accurately understood, I have shown the box mounting in connection with a conventional type of locomotive axle 10 to opposite ends of which are connected the wheels 11 having the hubs thereof faced as at 12. Actively associated with the axle 10 are the usual pedestals 13 between the sides of which are arranged vertically shiftable journal boxes 14 receiving cap bearings 15 for the axle.

Coming now more particularly to the subject of the present invention, the boxes 14 are each channeled out at opposite sides thereof to slidably receive a shoe 16 and a wedge 17. The shoes are identical in construction and are of the type illustrated in detail in Fig. 2 of the drawings, each shoe being substantially channel shaped in cross section and provided with a relatively thick side flange 18 and a relatively thinner confronting side flange 19. The wedges are also identical in construction and are of the type particularly shown in Fig. 3. As in the instance of the shoes, each of the wedges is substantially channel shaped in cross section with the bottom wall thereof tapered toward one end of the wedge and provided with a thick side flange 20 and a relatively thinner confronting side flange 21. At its thicker end, the wedge is notched in the usual manner to receive the usual screw 22 for adjusting the wedge vertically in the customary manner. The shoes and wedges are, as particularly shown in Fig. 1, arranged to receive the sides of the pedestals 13 to slidably support the boxes 14 and attention is now directed to the fact that the shoes and wedges are disposed with their thicker flanges 18 and 20 respectively, arranged outwardly toward the outer ends of the boxes.

Disposed to coöperate with the shoes and wedges are liners therefor and in the interest of clarity, the liner for the shoe of the right hand box is designated A and the liner for the shoe of the left hand box is designated B. In like manner, the liner for the wedge of the right hand box has been designated C while the liner for the wedge of the left hand box has been designated D.

The liners A and B are identical in construction and are of the type shown in detail in Fig. 2, each liner being of the general shape of an ordinary angle member and provided with a bottom flange 23 and a side flange 24. The liners C and D for the wedges are also identical in construction and are somewhat similar in shape to the liners for the shoes, being of the type illustrated in detail in Fig. 3. Each wedge liner includes a bottom flange 25 notched out to receive the screw 22 and a side flange 26 tapered longitudinally to correspond to the slope of the wedges.

As will now be noted upon reference to Fig. 1, the liners A and B are seated within the shoes 16 by their bottom flanges 23 while the liners C and D are seated within the wedges 17 by their bottom flanges 25 with the said flanges 23 and 25 bearing between the shoes and wedges and the sides of the pedestals and connected with the said shoes and wedges by rivets as illustrated in the drawings, or in any other approved manner. The side flanges 24 of the shoe liners are arranged to normally confront the thinner side flanges 19 of the shoes to bear between the said shoe flanges and the pedestals and in like manner, the side flanges 26 of the wedge liners are arranged to normally confront the thinner flanges 21 of the wedges to bear between the said wedge flanges and the pedestals. In this connection, attention is directed to the fact that the combined thickness of the side flanges 24 of the shoe liners and the flanges 19 of the shoes is just substantially equal to the thickness of the flanges 18 of the shoes. Also, the combined thickness of the flanges 26 of the wedge liners and the flanges 21 of the wedges is just substantially equal to the thickness of the thicker flanges 20 of the wedges. In this normal position of the wedge and shoe liners, the hub faces of the boxes 14 are held to closely confront the box faces of the hubs of the wheels to prevent any lateral play of the wheels.

The wheels 11 turning against the outer ends of the boxes 14 when in use will, of course, wear away the facings 12 as well as the hub faces at the outer ends of the journal boxes 14 and in Fig. 4 of the drawings, I have shown the manner in which the said wear is taken up. The shoe liners A and B are disconnected from the shoes 16 and turned end for end therein to be again attached to the shoes with the side flanges 24 of the liners bearing between the pedestals and the thicker flanges 18 of the shoes. The liners C and D of the wedges are also disconnected therefrom and the liner C of the right box shifted to the left box and the liner D of the left box shifted to the right box, this interchanging of the wedge liners being necessary owing to the taper of the side flanges of the said liners. When thus interchanged, the side flanges of the wedge liners will conform to the slope of the wedges and the said liners are again connected to the wedges with the side flanges 26 thereof bearing between the pedestals and the thicker flanges 20 of the wedges. The boxes 14 will thus be adjusted outwardly toward the wheel hubs 11 a distance equal to the thickness of the side flanges of the shoe and wedge liners to again bring the hub faces of the boxes close to the facings 12 of the hubs for overcoming any lateral play of the wheels. In this connection, attention is directed to the fact that the channels in the sides of the boxes are of standard dimensions while the shoes and wedges are also of standard exterior width to fit within the said channels so that the said shoes and wedges can be employed in connection with engine journal boxes as now in common use. Moreover, since the combined thickness of the side flanges of the shoe and wedge liners and the thinner flanges of the shoes and wedges is substantially equal to the thickness of the thicker flanges of the shoes and wedges, the shoes and wedges even though being formed with flanges of unequal thickness are, nevertheless, by means of the said liners adapted to receive the sides of the pedestals in the usual manner so that my improved shoe and wedge may be employed in connection with the conventional pedestal. The advantage of this arrangement will be apparent when it is considered that were the flanges of the shoes and wedges of equal thickness, the distance between the said flanges, in order to accommodate the liners, would necessarily be greater than employed upon a standard shoe and wedge. This increased distance between the said flanges of the shoes and wedges would necessitate a correspondingly increased width in the channels of the boxes, so that such wedges and shoes could not be used in connection with the standard type of engine journal box. By forming the flanges of the shoes and wedges of unequal thickness, I provide an arrangement whereby the liners may be employed for shifting the journal boxes laterally without the necessity of increasing the transverse dimensions of the shoes and wedges and consequently eliminate the requirement of a special type of journal box for the said shoes and wedges.

It will therefore be seen that I provide a simple and efficient arrangement for the purpose set forth and a construction wherein wear between the journal boxes and the wheel hubs may be expeditiously taken up to overcome any lateral play in the wheels, without the necessity of removing the wheels.

In Figs. 5 and 6 of the drawings, I have illustrated a modified form of the invention wherein the use of liners is eliminated, the modified structure pertaining particularly to the type of shoes and wedges employed. The shoe of the right box has been designated at E and the shoe of the left box at F. The wedge of the right box is designated at G and the wedge of the left box at H. The shoes E and F are each substantially channel-shaped in cross-section and respectively include a relatively thick side flange 27 and a thinner confronting side flange 28 with the flanges of the shoes snugly embracing the pedestals 13 at the adjacent sides thereof. The wedges G and H are also each substantially channel shaped in cross-section and respectively include a thick side flange 29 and a relatively thinner confronting side flange 30 with the flanges of the wedges snugly receiving the opposite sides of the pedestals. The shoes and wedges are, as particularly shown in Fig. 5 of the drawings, normally arranged with the thicker flanges thereof disposed inwardly with the said shoes and wedges supporting the boxes 14 close to the facings 12 of the wheel hubs. To take up wear between the outer ends of the boxes and the wheel hubs, the shoes E and F are reversed end for end upon the boxes and the wedges G and H interchanged as illustrated in Fig. 6 so that the thicker flanges of the shoes and wedges will then be presented outwardly. By so disposing the wedges and the shoes, the boxes will be adjusted outwardly toward the wheel hubs a distance corresponding to the difference in thickness between the thick and thin flanges of the flanges and shoes with the outer ends of the boxes then closely confronting the wheel hubs to overcome any lateral play in the wheels. Thus, this modified construction also provides a simple and efficient arrangement for accomplishing the purposes set forth.

Having thus described my invention, what I claim and desire to secure by Letters Patent is:

1. A journal box mounting including a shoe and wedge actively receiving the box with the said wedge and shoe each provided with side flanges of unequal thickness arranged for coöperation with a pedestal.

2. A journal box mounting including a shoe and wedge actively receiving the box and each provided with side flanges of unequal thickness, and liners arranged to bear between the thinner flanges of the shoe and wedge and a pedestal for the box received by the several shoe and wedge flanges.

3. A journal box mounting including a wedge and shoe actively receiving the box and each provided with coacting flanges of unequal thickness arranged for coöperation with a pedestal with the thinner flanges of the wedge and shoe disposed inwardly, and liners arranged to bear between the said thinner flanges of the shoe and wedge and a pedestal for the box with the liner of the shoe reversible end for end with respect to the shoe to confront the thicker flange of the said shoe and the liner of the wedge interchangeable with an opposed wedge liner of like character to dispose the opposed wedge liner to confront the thicker flange of the wedge for spacing the box laterally.

4. A journal box mounting including a shoe and wedge actively receiving the box and each provided with coacting flanges of unequal thickness, and liners arranged to bear between the thinner flanges of the shoe and wedge and a pedestal for the box received by the several shoe and wedge flanges, the combined thickness of each of the thinner flanges of the shoe and wedge and the said liners respectively being substantially equal to the respective thickness of the thicker flanges of the shoe and wedge.

5. The combination with right and left pedestals actively receiving corresponding journal boxes, of right and left shoes and wedges receiving the boxes and each formed with coacting side flanges of unequal thickness engaging the said pedestals, and liners bearing between the thinner flanges of the shoes and wedges and the pedestals with the liners of the shoes reversible end for end with respect to the said shoes and the right and left wedges interchangeable to dispose the liners to bear between the thicker flanges of the shoes and wedges and the pedestals for spacing the boxes laterally.

6. A journal box mounting including a shoe and wedge actively receiving the box and each provided with coacting flanges of unequal thickness, a shoe liner confronting the thinner flange of the shoe, and a wedge liner confronting the thinner flange of the wedge with the wedge and shoe liners normally disposed to bear between the thinner flanges of the shoe and wedge and a pedestal supporting the box, the shoe liner being shiftable with respect to the shoe to confront the thicker flange of the shoe and the wedge liner being interchangeable with an opposed wedge liner of like character to dispose the opposed wedge liner to confront the thicker flange of the wedge for spacing the box laterally.

7. The combination with a pedestal and a journal box supported thereby, of a shoe and wedge actively receiving the box and each provided with flanges of unequal thickness engaging the pedestal, a shoe liner having a flange bearing between the thinner flange of the shoe and the pedestal, and a wedge liner having a flange bearing between the thinner flange of the wedge and the pedestal, the shoe liner being reversible end for end with respect to the box to dispose the flange thereof to bear between the pedestal and the thicker flange of the shoe and the wedge liner being interchangeable with an opposed wedge liner of like character to dispose the flange of the opposed wedge liner to bear between the thicker flange of the wedge and the pedestal for spacing the box laterally with respect to the pedestal.

8. A journal box mounting including a shoe and wedge actively receiving the box with the said shoe and wedge each provided with side flanges of unequal thickness, and means bearing between the thinner flanges of the shoe and wedge and a pedestal for the box received by the several flanges of the said shoe and wedge.

9. A journal box mounting including a shoe and wedge each having flanges of unequal thickness and adapted to receive a pedestal for the box, and means arranged to coöperate with the said flanges for spacing the box laterally.

10. A journal box mounting including a shoe and wedge actively receiving the box and each provided with flanges of unequal thickness, a shoe liner seating against the bottom of the shoe and provided with a flange confronting the thinner flange of the shoe, and a wedge liner seating against the bottom of the wedge and provided with a flange confronting the thinner flange of the wedge with the shoe and wedge liners normally disposed to bear between the said thinner flanges of the shoe and wedge and a pedestal for the box, the shoe liner being reversible end for end with respect to the shoe to dispose the flange thereof to confront the thicker flange of the shoe and the wedge liner being interchangeable with an opposed wedge liner of like character to dispose the flange of the opposed wedge liner to confront the thicker flange of the wedge for spacing the box laterally.

In testimony whereof I affix my signature.

GEORGE H. LANGTON. [L. S.]

Copies of this patent may be obtained for five cents each, by addressing the "Commissioner of Patents, Washington, D. C."